(12) United States Patent
Tajima

(10) Patent No.: US 11,921,451 B2
(45) Date of Patent: Mar. 5, 2024

(54) IMAGE FORMING APPARATUS AND IMAGE FORMING SYSTEM

(71) Applicant: KYOCERA Document Solutions Inc., Osaka (JP)

(72) Inventor: Shinichi Tajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/101,170

(22) Filed: Jan. 25, 2023

(65) Prior Publication Data

US 2023/0244171 A1    Aug. 3, 2023

(30) Foreign Application Priority Data

Jan. 31, 2022    (JP) ................................ 2022-012937

(51) Int. Cl.
*G03G 15/00* (2006.01)
*G03G 21/16* (2006.01)

(52) U.S. Cl.
CPC ....... *G03G 15/5004* (2013.01); *G03G 15/556* (2013.01); *G03G 21/1652* (2013.01); *G03G 21/1657* (2013.01)

(58) Field of Classification Search
CPC ............. G03G 15/5004; G03G 15/556; G03G 21/1652; G03G 21/1657

USPC .......................................................... 399/88
See application file for complete search history.

(56) References Cited

FOREIGN PATENT DOCUMENTS

| CN | 100405236 | * | 7/2008 |
|---|---|---|---|
| JP | 2004230643 | * | 8/2004 |
| JP | 2006-106335 | | 4/2006 |

* cited by examiner

*Primary Examiner* — Hoan H Tran
(74) *Attorney, Agent, or Firm* — LEX IP MEISTER, PLLC

(57) ABSTRACT

An image forming apparatus connected to a user terminal includes: an apparatus side connecting part; a connection detecting part; an apparatus side mode switching part; and an apparatus side mode setting part. The apparatus side connecting part connects to the user terminal and outputs connection information. The connection detecting part detects whether or not the apparatus side connecting part is connected to the user terminal based on the connection information and outputs detection information. The apparatus side mode switching part outputs, based on the detection information, mode information indicating a mode to which a consumption amount of a resource consumed by the image forming apparatus is allocated. The apparatus side mode setting part sets, based on the mode information, an energy saving mode in which the consumption amount is reduced as compared with the consumption amount when the apparatus side connecting part and the user terminal are connected.

10 Claims, 3 Drawing Sheets

IMAGE FORMING APPARATUS AND IMAGE FORMING SYSTEM

INCORPORATION BY REFERENCE

This application is based upon and claims the benefit of priority from the corresponding Japanese Patent Application No. 2022-012937 filed on Jan. 31, 2021, the entire contents of which are incorporated herein by reference.

FIELD

The present disclosure relates to an image forming apparatus and an image forming system.

BACKGROUND

As a typical method of controlling switching between standby modes, the standby mode can be switched according to user's intention. However, the above-described typical method does not deal with switching of modes according to a communication state between a user terminal and an image forming apparatus.

The present disclosure provides an image forming apparatus and an image forming system that switch between modes to which a consumption amount of a resource consumed by the image forming apparatus is allocated, depending on whether or not a user terminal and the image forming apparatus are communicably connected.

SUMMARY

An image forming apparatus communicably connected to a user terminal includes: an apparatus side connecting part; a connection detecting part; an apparatus side mode switching part; and an apparatus side mode setting part.

The apparatus side connecting part communicably connects to the user terminal and outputs connection information.

The connection detecting part detects whether or not the apparatus side connecting part is communicably connected to the user terminal based on the connection information and outputs detection information.

The apparatus side mode switching part outputs, based on the detection information, mode information indicating a mode to which a consumption amount of a resource consumed by the image forming apparatus is allocated.

The apparatus side mode setting part sets, based on the mode information, an energy saving mode in which the consumption amount of the resource consumed by the image forming apparatus is reduced as compared with the consumption amount of the resource consumed by the image forming apparatus in a case where the apparatus side connecting part and the user terminal are communicably connected.

An image forming system includes: a user terminal; and an image forming apparatus communicably connected to the user terminal, and the image forming apparatus including: an apparatus side connecting part that communicably connects to the user terminal and outputs connection information; a connection detecting part that detects whether or not the apparatus side connecting part is communicably connected to the user terminal based on the connection information and outputs detection information; an apparatus side mode switching part that outputs, based on the detection information, mode information indicating a mode to which a consumption amount of a resource consumed by the image forming apparatus is allocated; and an apparatus side mode setting part that sets, based on the mode information, an energy saving mode in which the consumption amount of the resource consumed by the image forming apparatus is reduced as compared with the consumption amount of the resource consumed by the image forming apparatus in a case where the apparatus side connecting part and the user terminal are communicably connected, and the user terminal including: a terminal side connecting part that is communicably connected to the image forming apparatus, where the apparatus side connecting part is communicably connected to the terminal side connecting part and outputs the connection information, and the connection detecting part detects whether or not the apparatus side connecting part is communicably connected to the terminal side connecting part on the basis of the connection information and outputs the detection information.

DETAILED DESCRIPTION

First Embodiment

Figure 1:
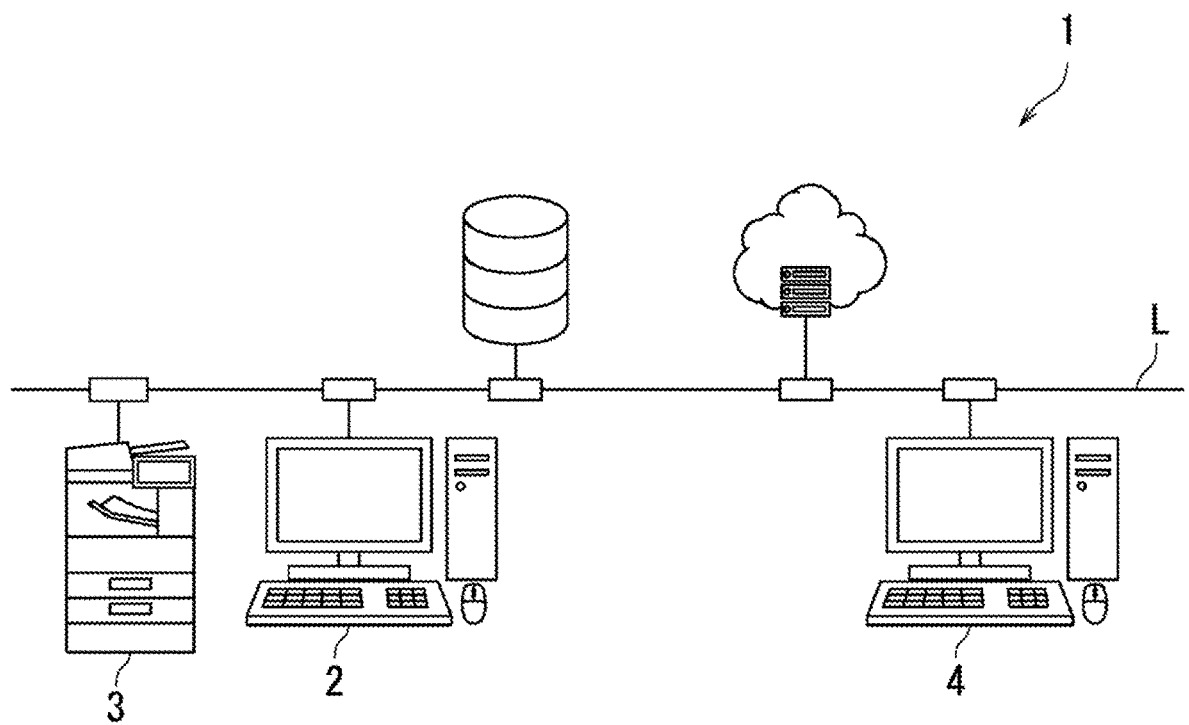
FIG. 1 is a diagram illustrating a configuration of an image forming system including an image forming apparatus according to the present embodiment.

First, the configuration of an image forming system 1 according to the present embodiment will be described with reference to FIG. 1. FIG. 1 is the diagram illustrating the configuration of the image forming system 1 according to the present embodiment. The present embodiment described in FIG. 1 can be applied to all the embodiments and specific examples of the present disclosure.

As illustrated in FIG. 1, the image forming system 1 includes a user terminal 2, and an image forming apparatus 3 and a management terminal 4 communicably connected to the user terminal 2.

The user terminal 2, the image forming apparatus 3, and the management terminal 4 are connected to each other via lines L. The line L includes, for example, a local area network (LAN), an Intranet, a wide area network (WAN), the Internet, and the like.

The LAN is a computer network used in, for example, businesses such as offices and factories of corporations and government offices, schools, and homes. It refers to technical methods and standards of communication cables and data link layers typified by Ethernet (Registered Trademark) in a narrow sense, and refers to computer networks and information processing systems used in offices and homes in a broad sense. The Intranet is, for example, a network environment created only within an organization such as a company.

The WAN is a wide area network which extends, for example, from an urban area to a suburb, outside a prefecture, and an overseas area, and is a public network which connects scattered LANs. The Internet is a global information communication network that interconnects multiple computer networks using, for example, the Internet Protocol suite. The WAN is implemented worldwide by the Internet.

Next, configurations of the user terminal 2, the image forming apparatus 3, and the management terminal 4 will be described with reference to FIG. 2.

Figure 2:
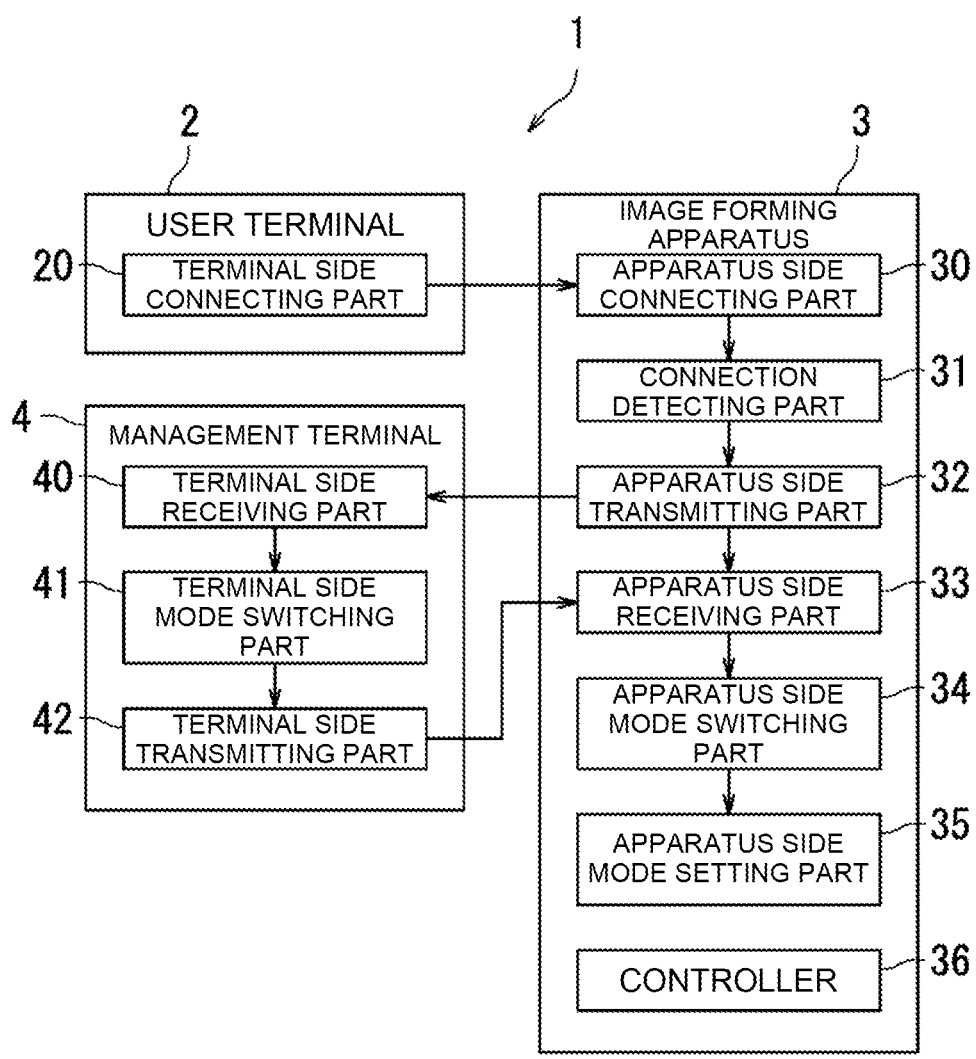
FIG. 2 is a block diagram illustrating a configuration of the image forming system including the image forming apparatus according to the present embodiment.

FIG. 2 is the block diagram illustrating the configuration of the image forming system 1 according to the present embodiment.

Specific configurations of the user terminal 2 and the management terminal 4 will be described in a second embodiment.

An example of the user terminal 2 is a personal computer (PC). For example, the user terminal 2 may be moved to a home, a spot office, or the like when the user performs work at home or the like.

Examples of the PC include a laptop PC, a notebook PC, and a tablet. In a case where a PC is moved to a home, a spot office, or the like when a user performs work at home or the like, a notebook PC is suitable as an example of the PC.

A terminal side connecting part 20 can be implemented by a coder/decoder (CODEC) for example.

Next, an outline of the image forming apparatus 3 will be described. The image forming apparatus 3 forms the image on a sheet based on image data. Examples of the sheet are a sheet or an overhead projector (OHP) sheet. The OHP sheet is a transparent film on which text or a figure is drawn, which is used for an overhead projector.

For example, the image forming apparatus 3 may be installed in an office, a government office, a school, a factory or the like.

The image forming apparatus 3 may be a multifunction peripheral. The multifunction peripheral is a combination of an image reading function of an image reading device and an image forming function of the image forming apparatus 3. The multifunction peripheral includes functions as, for example, a scanner, a printer, a copier, a telephone, a printer, a facsimile, and the like.

The image reading device includes a document tray, a document conveyance device, a document reading part, and a document ejection tray.

The image reading device reads the image on the document and outputs image information. An example of the image reading device is the scanner. The document conveyance device can be attached to the image reading device. An example of the document conveyance device is an automatic document feeder (ADF).

The document tray stores the document.

The document reading part reads the image from the document conveyed from the document tray.

The document reading part generates image data from the read image. The document reading part adopts a contact image sensor (CIS) method or a charge coupled devices (CCD) method.

The document ejection tray stores the document from which the image has been read.

The image forming apparatus 3 forms the image on the sheet.

The image forming apparatus 3 includes a sheet feed device, a sheet conveyance device, an image forming part, a fixing device, and a sheet ejection device.

The sheet feed device includes a sheet tray and a pickup roller. The sheet tray stores sheets therein. The pickup roller picks up the sheets stored in the sheet tray one by one and feeds the sheet to the sheet conveyance device.

The image forming part forms the image on the sheet with toner or ink. When the image forming part performs an electrophotographic method, the image forming part includes a photoreceptor, a charging device, an exposure device, a developing device, a transfer device, a cleaning device, and a discharging device.

The photoreceptor is, for example, a photosensitive drum. The photosensitive drum has a photosensitive layer on an outer peripheral surface thereof. Examples of the photosensitive drum are a selenium drum and an organic photoconductor (OPC).

The charging device charges the photosensitive layer of the photoreceptor to a predetermined potential. An example of the charging device is a corona discharge device.

The exposure device irradiates and exposes the photosensitive layer of the photoreceptor with laser light. The exposure device exposes the photosensitive layer of the photoreceptor based on the image data. An electrostatic latent image is formed on the photoreceptor as a result. An example of the exposure device is a light emitting diode (LED).

For example, the developing device stores a two component developer including a carrier including a magnetic body and the toner. The developing device then develops the electrostatic latent image formed on the photoreceptor with the toner to form a toner image on the photoreceptor. The transfer device transfers the toner image on the photoreceptor to the sheet. The cleaning device removes the residual toner remaining on the photoreceptor after the transfer. The discharging device causes discharging of the photoreceptor.

When the image forming apparatus 3 is an inkjet printer, the image forming part includes ink cartridges, ink tanks, pumps, heads, nozzles, electrodes, and a conveyance belt.

The ink cartridges and the ink tanks store, for example, aqueous inks of respective colors of yellow (Y), magenta (M), cyan (C), and black (Bk).

The pump supplies ink from the ink tank to the head.

In the head, a large number of nozzles forming pixels are arranged. Ink of the color corresponding to the image data is supplied from the ink tank to the head, based on the image data. The Ink is ejected from the nozzles toward the sheet.

The electrodes include, for example, charging electrodes and deflection electrodes. The charging electrode charges ink ejected from the nozzle. The deflection electrode controls a flying direction of the charged ink.

The conveyance belt is disposed opposite the nozzles of the head and conveys the sheet. The image is formed on the sheet conveyed by the conveyance belt with ink ejected from the nozzles of the head.

Next, when the image forming apparatus 3 performs an electrophotographic method, the fixing device provides heat and pressure to the toner image developed on the sheet to fix the toner image on the sheet. The fixing device includes, for example, a fixing roller, a heater, and a press roller.

The fixing roller is a hollow cylindrical roller. The fixing roller is pressed against the press roller. The press roller and the fixing roller form a nip part. The press roller is rotationally driven by a driver (not illustrated) and forms the nip part with the fixing roller to rotate the fixing roller.

The heater heats the fixing roller by receiving electric power from an electric power source (not illustrated). The heater is disposed adjacent to an inner peripheral surface of the fixing roller. The sheet conveyed to the fixing device is passed through the nip part and heated by the heater, and the toner image is fixed.

In a case where the image forming apparatus 3 is an inkjet printer, a fixing device is not necessary.

The sheet ejection device ejects the sheet to the outside of the main body of the image forming apparatus 3. The sheet ejection device includes a sheet ejection roller and a sheet ejection tray. The sheet ejection roller ejects the sheet conveyed by the conveyance device from the fixing device to the sheet ejection tray. The sheet ejection tray stores the ejected sheet therein.

Next, a control of the image forming apparatus 3 will be described. When detecting that the image forming apparatus 3 is not communicably connected to the user terminal 2, the image forming apparatus 3 according to the first embodiment generally determines that, for example, the user is working at home and has carried back the user terminal 2. Since the user terminal 2 is not located near the image forming apparatus 3, it is expected that the use frequency of the image forming apparatus 3 will decrease, and thus the image forming apparatus 3 is switched to an energy saving mode.

The image forming apparatus 3 can be communicably connected to the user terminal 2.

The image forming apparatus 3 includes an apparatus side connecting part 30, a connection detecting part 31, an apparatus side transmitting part 32, an apparatus side receiving part 33, an apparatus side mode switching part 34, an apparatus side mode setting part 35 and a controller 36.

The apparatus side connecting part 30 is communicably connected to the user terminal 2 and outputs connection information.

The connection information indicates that the user terminal 2 and the image forming apparatus 3 are communicably connected to each other. The connection information indicates that the user terminal 2 and the image forming apparatus 3 are not communicably connected.

The connection detecting part 31 detects whether or not the apparatus side connecting part 30 is communicably connected to the user terminal 2 on the basis of the connection information and outputs detection information.

The detection information indicates that it has been determined and detected that a communication connection between the user terminal 2 and the image forming apparatus 3 has been established. The detection information indicates that it has been determined and detected that the communication connection between the user terminal 2 and the image forming apparatus 3 has not been established.

For example, the apparatus side connecting part 30 and the connection detecting part 31 can be implemented by an Application Specific Integrated Circuit (ASIC).

The apparatus side transmitting part 32 and the apparatus side receiving part 33 will be described later.

Based on the detection information, the apparatus side mode switching part 34 outputs mode information indicating a mode to which a consumption amount of a resource consumed by the image forming apparatus 3 is allocated.

In other words, the apparatus side mode switching part 34 switches, based on the detection information detected by the connection detecting part 31, the mode to which the consumption amount of the resource consumed by the image forming apparatus 3 is allocated, and outputs mode information indicating the switched mode.

Examples of the resources consumed by the image forming apparatus 3 include the electric power, the toner, the ink, and the sheet.

Examples of the modes include a normal mode in which a normal amount of the resource is consumed and the energy saving mode in which the resources are saved.

The apparatus side mode setting part 35 sets, based on the mode information, the energy saving mode in which the consumption amount of the resource consumed by the image forming apparatus 3 is reduced as compared with a case where the apparatus side connecting part 30 and the user terminal 2 are communicably connected to each other.

That is, when the user brings the user terminal 2 back to home from office due to working at home or the like, the user terminal 2 is not located near the image forming apparatus 3. Therefore, it is expected that an operation amount of the image forming apparatus 3 associated with the user terminal 2 decreases.

Therefore, the apparatus side mode setting part 35 sets the energy saving mode in response to a decrease in the operation amount of the image forming apparatus 3.

Specifically the apparatus side mode setting part 35 may set the energy saving mode in which a consumption amount of electric power consumed by the image forming apparatus 3 is reduced as compared with a case where the apparatus side connecting part 30 and the terminal side connecting part 20 are communicably connected to each other.

The apparatus side mode setting part 35 may set the energy saving mode in which the time during which the image forming apparatus 3 is in a sleep state is longer than that in the normal mode.

The apparatus side mode setting part 35 may set the energy saving mode in which the image forming apparatus 3 is turned off.

The apparatus side mode setting part 35 may set the energy saving mode in which the consumption amount of the toner and the ink consumed by the image forming apparatus is reduced by storing a received job in a storage part (not shown) and not allowing the image forming part to form the image on the sheet.

According to the present embodiment, in a case where the user terminal 2 is not located near the image forming apparatus 3, it is possible to reduce the consumption amount of the electric power, the toner, the ink, and other resources consumed by the image forming apparatus 3.

According to the present embodiment, the mode to which the consumption amount of the resource consumed by the image forming apparatus 3 is allocated can be switched according to whether or not the user terminal 2 and the image forming apparatus 3 are communicably connected to each other.

Furthermore, according to the present embodiment, in a case where it is determined that the user terminal 2 is not located near the image forming apparatus 3, the energy saving mode in which the consumption amount of the resource consumed by the image forming apparatus 3 is reduced can be set, thereby achieving energy saving of the resource consumed by the image forming apparatus 3.

The user terminal 2 and the apparatus side connecting part 30 may be connected by a wireless LAN standard.

As the wireless LAN standard, the Institute of Electrical and Electronics Engineers (IEEE) 802.11 is maintained. The wireless LAN is a network composed of devices compliant with the IEEE802.11 standards. The Wireless Fidelity (Wi-Fi) (Registered Trademark) is a kind of the wireless LAN, and Wi-Fi compatible devices are wirelessly connected to each other via a router.

The wireless LAN standard may be a Wi-Fi direct. In the Wi-Fi direct, devices can directly communicate with each other on a one to-one basis without a wireless LAN router or an access point. That is, when the user terminal 2 and the apparatus side connecting part 30 support the Wi-Fi direct, the user terminal 2 and the apparatus side connecting part 30 can directly perform wireless connection without any wireless LAN router.

The apparatus side connecting part 30 of the image forming apparatus 3 is communicably connected to the user terminal 2 and outputs the connection information. That is, for example, when the apparatus side connecting part 30 of the image forming apparatus 3 and the user terminal 2 are connected by the Wi-Fi direct, the apparatus side connecting part 30 of the image forming apparatus 3 outputs the connection information indicating that it has been connected to the user terminal 2 by the Wi-Fi direct.

The connection detecting part 31 of the image forming apparatus 3 detects that the apparatus side connecting part 30 is communicably connected to the user terminal 2 on the basis of the connection information indicating that the user terminal 2 and the image forming apparatus 3 are connected to each other by the Wi-Fi direct. The connection detecting part 31 outputs the detection information indicating that the apparatus side connecting part 30 is communicably connected to the user terminal 2.

In other words, when the user terminal 2 and the image forming apparatus 3 are connected by the Wi-Fi direct, the connection detecting part 31 can detect that the user terminal 2 is located near the image forming apparatus 3. The connection detecting part 31 may output the detection information indicating that the user terminal 2 is located near the image forming apparatus 3.

However, when the user terminal 2 is installed at a place far from the image forming apparatus 3, for example, when the user carries the user terminal 2 back, the user terminal 2 cannot make a Wi-Fi direct connection with the image forming apparatus 3.

When the apparatus side connecting part 30 of the image forming apparatus 3 and the user terminal 2 are no longer connected by the Wi-Fi direct, the apparatus side connecting part 30 of the image forming apparatus 3 outputs the connection information indicating that it is no longer connected by the Wi-Fi direct to the user terminal 2.

In other words, when the user terminal 2 and the image forming apparatus 3 are not connected by the Wi-Fi direct, the connection detecting part 31 can detect that the user terminal 2 is not located near the image forming apparatus 3. The connection detecting part 31 may output the detection information indicating that the user terminal 2 is not located near the image forming apparatus 3.

The connection detecting part 31 of the image forming apparatus 3 detects that the apparatus side connecting part 30 is not communicably connected to the user terminal 2 on the basis of the connection information indicating that the user terminal 2 and the image forming apparatus 3 are no longer connected to each other by the Wi-Fi direct. The connection detecting part 31 outputs the detection information indicating that the apparatus side connecting part 30 is not communicably connected to the user terminal 2.

According to the present embodiment, the user terminal 2 and the image forming apparatus 3 can easily be wirelessly connected to each other over the wireless LAN, and can more easily be connected to each other over the Wi-Fi direct.

Next, when the detection information indicates that it has been detected, based on the mode information, that the apparatus side connecting part 30 and the user terminal 2 are not communicably connected, the apparatus side mode setting part 35 may further set the normal mode in which the consumption amount of the resource consumed by the image forming apparatus 3 is increased as compared with the case where the detection information indicates that the apparatus side connecting part 30 and the user terminal 2 are not communicably connected.

Specifically for example, when a user brings the user terminal 2 back home for work at home or the like and then brings the user terminal 2 from home to office for work at office or the like, the user terminal 2 is located near the image forming apparatus 3. Therefore, the operation amount of the image forming apparatus 3 associated with the user terminal 2 is expected to increase.

Accordingly the apparatus side mode setting part 35 sets the normal mode according to the increase in the operation amount of the image forming apparatus 3. The apparatus side mode setting part 35 may set a normal mode for increasing the amount of resources consumed by the image forming apparatus 3 based on the mode information.

The apparatus side mode setting part 35 may set a normal mode in which the consumption amount of the electric power consumed by the image forming apparatus 3 is larger than that of the energy saving mode.

The apparatus side mode setting part 35 may set the time during which the image forming apparatus 3 is in the sleep state shorter than that in the energy saving mode.

The apparatus side mode setting part 35 may switch the electric power source of the image forming apparatus 3 from OFF to ON.

The apparatus side mode setting part 35 may receive a job and form an image on a sheet by the image forming part.

According to this embodiment, when the user terminal 2 is located near the image forming apparatus 3, it is possible to normally operate the image forming apparatus 3 without reducing the consumption amount of the resource such as the electric power, the toner, the ink, and the like consumed by the image forming apparatus 3.

Next, as shown in FIG. 2, the image forming apparatus 3 may further include a controller 36. In the energy saving mode, the controller 36 reduces the consumption amount of the electric power consumed by the image forming apparatus 3.

In the energy saving mode, the controller 36 may reduce the consumption amount of the toner consumed by the image forming apparatus 3.

In the energy saving mode, the controller 36 may reduce an image forming output amount of the image forming apparatus 3 based on facsimile (FAX) communication.

Further, the controller 36 may determine whether or not to continue the operation or driving of the image forming apparatus 3.

The controller 36 is, for example, a processor such as a central processing unit (CPU). The controller 36 may be an integrated circuit such as a system-on-a-chip (SoC) in which other components are integrated. The controller 36 may be formed by combining a plurality of integrated circuits. The controller 36 collectively controls the operation of the image forming apparatus 3 to realize various functions.

According to the present embodiment, the image forming apparatus 3 can switch between a normal mode and an energy saving mode depending on whether or not the user terminal 2 is disposed in the vicinity, and resources can be efficiently utilized.

Second Embodiment

Next, with continued reference to FIG. 2, the control performed by the image forming system 1 according to the second embodiment will be described.

Furthermore, redundant description of items described in the control of the image forming apparatus 3 in the first embodiment is omitted.

As illustrated in FIG. 1, the image forming system 1 according to the second embodiment includes at least a user terminal 2 and an image forming apparatus 3 communicably connected to the user terminal 2.

In the image forming system 1 according to the second embodiment, generally when the image forming apparatus 3 detects that it is not communicably connected to the user terminal 2, the image forming apparatus 3 determines that, for example, the user is working at home and has carried back the user terminal 2. Since the image forming apparatus 3 is not located near the user terminal 2, it is expected that the user frequency of the image forming apparatus 3 will decrease, and thus the image forming apparatus 3 is switched to the energy saving mode.

The user terminal 2 includes a terminal side connecting part 20. The terminal side connecting part 20 communicably connects the user terminal 2 and the image forming apparatus 3.

The apparatus side connecting part 30 of the image forming apparatus 3 is communicably connected to the terminal side connecting part 20 of the user terminal 2 and outputs the connection information.

The connection detecting part 31 of the image forming apparatus 3 detects whether the apparatus side connecting part 30 is communicably connected to the terminal side connecting part 20 of the user terminal 2 on the basis of the connection information and outputs the detection information.

The apparatus side mode switching part 34 of the image forming apparatus 3 outputs, based on the detection information, the mode information indicating the mode to which the consumption amount of the resource consumed by the image forming apparatus 3 is allocated.

When the detection information indicates that it has been detected, based on the mode information, that the apparatus side connecting part 30 has not been communicably connected to the terminal side connecting part 20, the apparatus side mode setting part 35 of the image forming apparatus 3 sets the energy saving mode in which the consumption amount of the resource consumed by the image forming apparatus 3 is reduced as compared with the case where the apparatus side connecting part 30 and the terminal side connecting part 20 have been communicably connected.

For example, after setting the energy saving mode, when the detection information indicates that it has been detected that the apparatus side connecting part 30 is communicably connected to the terminal side connecting part 20 based on the mode information, the apparatus side mode setting part 35 of the image forming apparatus 3 may set the normal mode in which the consumption amount of the resource consumed by the image forming apparatus 3 is increased as compared with the case where the detection information indicates that the apparatus side connecting part 30 and the terminal side connecting part 20 are not communicably connected.

According to the present embodiment, the mode to which the consumption amount of the resource consumed by the image forming apparatus 3 is allocated can be switched according to whether or not the user terminal 2 and the image forming apparatus 3 are communicably connected to each other.

Furthermore, according to the present embodiment, in a case where it is determined that the user terminal 2 is not located near the image forming apparatus 3, the energy saving mode in which the consumption amount of the resource consumed by the image forming apparatus 3 is reduced can be set, thereby achieving energy saving of the resource consumed by the image forming apparatus 3.

Third Embodiment

Next, the image forming system 1 according to the third embodiment will be described. In the third embodiment, redundant description of the matters described in the first embodiment and the second embodiment will be omitted.

As illustrated in FIG. 1, the image forming system 1 according to the third embodiment further includes a management terminal 4 in addition to the user terminal 2 and the image forming apparatus 3 communicably connected to the user terminal 2.

The image forming system 1 according to the third embodiment is generally a system in which the management terminal 4 manages the user terminals 2 and the image forming apparatuses 3. When detecting that the user terminal 2 and the image forming apparatus 3 are not communicably connected, the management terminal 4 determines that, for example, the user is working at home and has carried back the user terminal 2. Since the user terminal 2 is not located near the image forming apparatus 3, it is expected that the user frequency of the image forming apparatus 3 will decrease, and therefore the management terminal 4 switches the image forming apparatus 3 to the energy saving mode.

As illustrated in FIG. 2, the image forming apparatus 3 further includes the apparatus side transmitting part 32 and the apparatus side receiving part 33.

The management terminal 4 includes a terminal side receiving part 40, a terminal side mode switching part 41, and a terminal side transmitting part 42.

The user terminal 2 includes the terminal side connecting part 20. The terminal side connecting part 20 communicably connects the user terminal 2 and the image forming apparatus 3.

The apparatus side connecting part 30 of the image forming apparatus 3 is communicably connected to the terminal side connecting part 20 of the user terminal 2 and outputs connection information.

The connection detecting part 31 of the image forming apparatus 3 detects whether the apparatus side connecting part 30 is communicably connected to the terminal side connecting part 20 of the user terminal 2 on the basis of the connection information and outputs the detection information.

The apparatus side transmitting part 32 of the image forming apparatus 3 transmits the detection information.

Next, the management terminal 4 switches the mode of the image forming apparatus 3 according to the communication connection status between the user terminal 2 and the image forming apparatus 3.

An example of the management terminal 4 is the terminal installed in the office, the government office, the school, the factory, or the like. A specific example of the management terminal 4 is a management PC, a server, and a cloud.

The server stores data and provides the corresponding data when requested via the communication line.

The cloud is a usage form that provides computer resources via the computer network such as the Internet, and for example includes applications, platforms, and infrastructures.

The terminal side receiving part 40 of the management terminal 4 receives the detection information.

Based on the detection information, the terminal side mode switching part 41 outputs setting mode information indicating a mode to which the consumption amount of the resource consumed by the image forming apparatus 3 is allocated.

The terminal side transmitting part 42 transmits the setting mode information to the apparatus side receiving part 33.

The apparatus side receiving part 33 receives the setting mode information.

When the detection information indicates that it has been detected, based on the mode information, that the apparatus side connecting part 30 is not communicably connected to the terminal side connecting part 20, the apparatus side mode setting part 35 sets the energy saving mode in which the consumption amount of the resource consumed by the image forming apparatus 3 is reduced as compared with the case where the detection information indicates that the apparatus side connecting part 30 and the terminal side connecting part 20 are communicably connected.

According to the present embodiment, in a case where the user terminal 2 is not located near the image forming apparatus 3, the management terminal 4 can reduce the consumption amount of the electric power, the toner, the ink, and other resources consumed by the image forming apparatus 3.

According to the present embodiment, depending on whether the user terminal 2 and the image forming apparatus 3 are communicably connected to each other, the management terminal 4 can switch the mode to which the consumption amount of the resource consumed by the image forming apparatus 3 is allocated.

Furthermore, according to the present embodiment, when it is determined that the user terminal 2 is not located near the image forming apparatus 3, the management terminal 4 can set the energy saving mode in which the consumption amount of the resource consumed by the image forming apparatus 3 is reduced, thereby achieving energy saving of the resource consumed by the image forming apparatus 3.

Next, when the detection information indicates that it has been detected, based on the mode information, that the apparatus side connecting part 30 is communicably connected to the terminal side connecting part 20, the apparatus side mode setting part 35 may set the normal mode in which the consumption amount of the resource consumed by the image forming apparatus 3 is increased as compared with the case where the detection information indicates that the apparatus side connecting part 30 and the terminal side connecting part 20 are not communicably connected.

According to the present embodiment, in a case where the user terminal 2 is located near the image forming apparatus 3, the user terminal 2 can be normally operated without reducing consumption amount of the electric power, the toner, the ink, and other resources consumed by the image forming apparatus 3.

Figure 3:
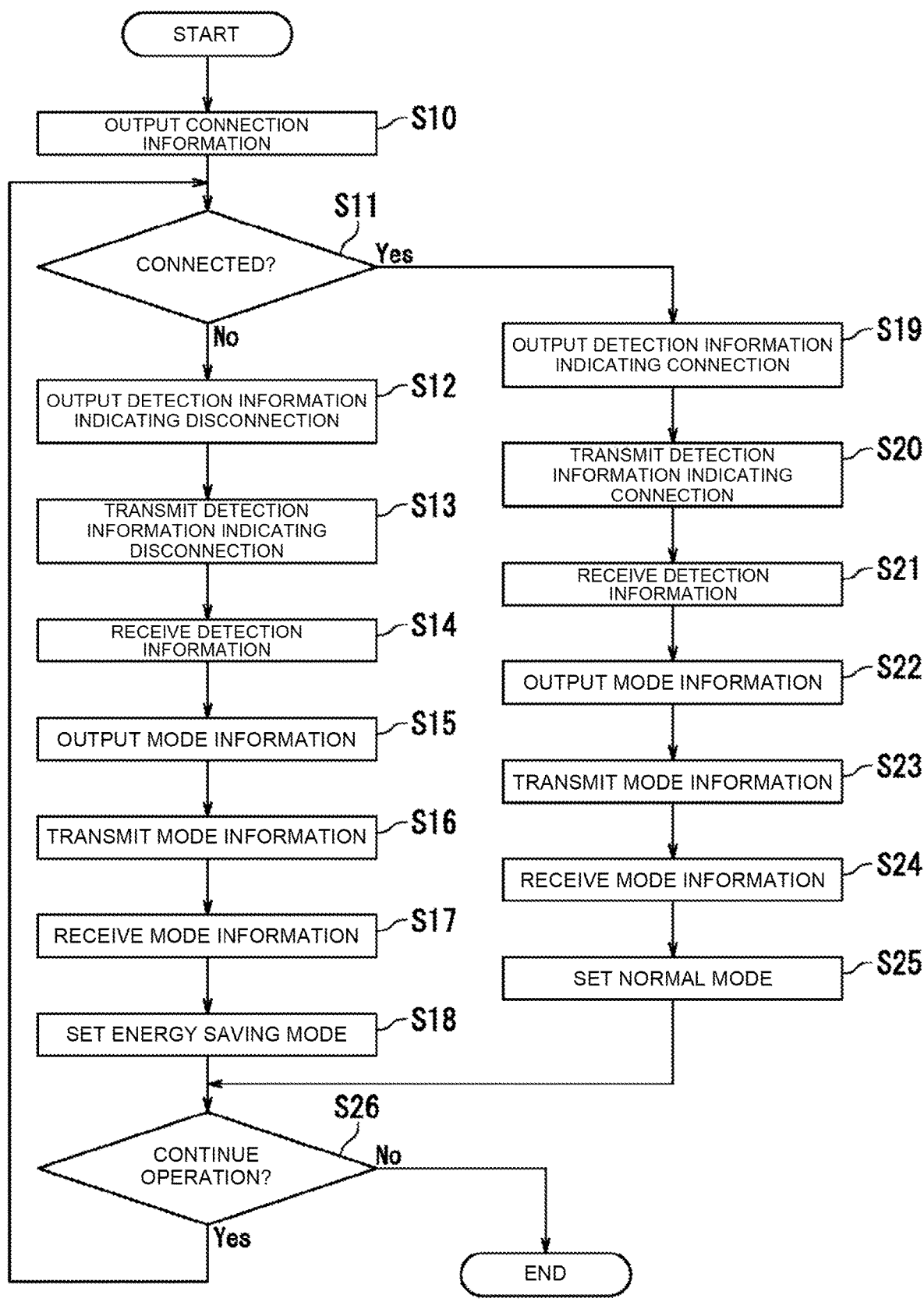
FIG. 3 is a flowchart illustrating control of the image forming system including the image forming apparatus according to the present embodiment.

Next, the control of the image forming system 1 will be described referring to FIG. 3. FIG. 3 is a flowchart illustrating the control of the image forming system 1 according to the present embodiment.

As illustrated in FIG. 3, the flowchart includes step S10 to step S26. In the first and second embodiments, a part of processes from step S10 to step S26 is performed. In the third embodiment, all the processes from steps S10 to S26 are performed. Specifically it is as follows.

In step S10 illustrated in FIG. 3, the apparatus side connecting part 30 of the image forming apparatus 3 is communicably connected to the terminal side connecting part 20 and outputs the connection information. The process proceeds to step S11.

In step S11, the connection detecting part 31 of the image forming apparatus 3 detects, based on the connection information, whether the apparatus side connecting part 30 is communicably connected to the terminal side connecting part 20.

When it is detected in step S11 that the communication connection has not been established (No in step S11), the process proceeds to step S12. When it is detected that communication connection is established (Yes in step S11), the process proceeds to step S19.

If No in step S11, in step S12, the connection detecting part 31 outputs the detection information indicating that the user terminal 2 is not located near the image forming apparatus 3. The process proceeds to step S13.

In step S13, the apparatus side transmitting part 32 of the image forming apparatus 3 transmits the detection information indicating that the user terminal 2 is not located near the image forming apparatus 3. The process proceeds to step S14.

In step S14, the terminal side receiving part 40 of the management terminal 4 receives the detection information. The process proceeds to step S15.

In step S15, the terminal side mode switching part 41 of the management terminal 4 switches the mode to which the consumption amount of the resource consumed by the image forming apparatus 3 is allocated on the basis of the detection information received by the terminal side receiving part 40, and outputs the setting mode information indicating the switched mode. The process proceeds to step S16.

In step S16, the terminal side transmitting part 42 of the management terminal 4 transmits the setting mode information. The process proceeds to step S17.

In step S17, the apparatus side receiving part 33 of the image forming apparatus 3 receives the setting mode information. The process proceeds to step S18.

In step S18, the apparatus side mode setting part 35 of the image forming apparatus 3 sets, based on the setting mode information, the energy saving mode in which the consumption amount of the resource consumed by the image forming apparatus 3 is reduced. The apparatus side mode setting part 35 may set the energy saving mode in which the consumption amount of the resource consumed by the image forming apparatus 3 is reduced, based on the mode information output by the apparatus side mode switching part 34. The process proceeds to step S26.

Next, if Yes in step S11, in step S19, the connection detecting part 31 outputs the detection information indicating that the user terminal 2 is located near the image forming apparatus 3. The process proceeds to step S20.

In step S20, the apparatus side transmitting part 32 of the image forming apparatus 3 transmits the detection information indicating that the user terminal 2 is located near the image forming apparatus 3. The process proceeds to step S21.

In step S21, the terminal side receiving part 40 of the management terminal 4 receives the detection information. The process proceeds to step S22.

In step S22, the terminal side mode switching part 41 of the management terminal 4 switches the mode to which the consumption amount of the resource consumed by the image forming apparatus 3 is allocated, based on the detection information received by the terminal side receiving part 40, and outputs the mode information indicating the switched mode. The process proceeds to step S23.

In step S23, the terminal side transmitting part 42 of the management terminal 4 transmits the setting mode information. The process proceeds to step S24.

In step S24, the apparatus side receiving part 33 of the image forming apparatus 3 receives the setting mode information. The process proceeds to step S25.

In step S25, the apparatus side mode setting part 35 of the image forming apparatus 3 sets, based on the setting mode information, the normal mode in which the consumption amount of the resource consumed by the image forming apparatus 3 is increased. The apparatus side mode setting part 35 may set the energy saving mode in which the consumption amount of the resource consumed by the image forming apparatus 3 is reduced, based on the mode information output by the apparatus side mode switching part 34. The process proceeds to step S26 illustrated in FIG. 3.

In step S26, the controller 36 of the image forming apparatus 3 determines whether to continuously operate or drive the image forming apparatus 3. If the operation or the driving of image forming apparatus 3 is to be continued (Yes in step S26), the process proceeds to step S11. If the operation or the driving of image forming apparatus 3 is not to be continued (No in step S26), the process ends.

According to the image forming apparatus of the present disclosure, the mode to which the consumption amount of the resource consumed by the image forming apparatus is allocated can be switched depending on whether or not the user terminal and the image forming apparatus are communicably connected to each other.

The embodiment of the present disclosure has been described above with reference to the drawings. Provided that the present disclosure is not limited to the above-described embodiment, and can be implemented in various aspects without departing from the spirit of the present disclosure. The drawings may schematically illustrate respective constituent elements as main constituent elements for easier understanding. The number of each constituent element illustrated in the drawings and the like may be different from actual ones for convenience of drawing creation. Furthermore, the constituent elements illustrated in the above-described embodiment are examples and are not particularly limited, and various changes can be made therein without substantially departing from the effects of the present disclosure.

What is claimed is:

1. An image forming apparatus communicably connected to a user terminal, comprising:
    an apparatus side connecting part that communicably connects to the user terminal and outputs connection information;
    a connection detecting part that detects whether or not the apparatus side connecting part is communicably connected to the user terminal based on the connection information and outputs detection information;
    an apparatus side mode switching part that outputs, based on the detection information, mode information indicating a mode to which a consumption amount of a resource consumed by the image forming apparatus is allocated; and
    an apparatus side mode setting part that sets, based on the mode information, an energy saving mode in which the consumption amount of the resource consumed by the image forming apparatus is reduced as compared with the consumption amount of the resource consumed by the image forming apparatus in a case where the apparatus side connecting part and the user terminal are communicably connected.

2. The image forming apparatus according to claim 1, wherein
    the user terminal and the apparatus side connecting part are connected by a wireless local area network (LAN) standard.

3. The image forming apparatus according to claim 2, wherein
    the wireless LAN standard includes Wireless Fidelity (Wi-Fi) (Registered Trademark) direct.

4. The image forming apparatus according to claim 1, wherein
    the apparatus side mode setting part further sets, based on the mode information, a normal mode in which the consumption amount of the resource consumed by the image forming apparatus is increased as compared with the consumption amount of the resource consumed by the image forming apparatus in a case where the detection information indicates that the apparatus side connecting part and the user terminal are not communicably connected.

5. The image forming apparatus according to claim 1, further comprising a controller, wherein
    the controller reduces an amount of electric power consumed by the image forming apparatus in the energy saving mode.

6. The image forming apparatus according to claim 1, further comprising a controller, wherein
    the controller reduces an amount of toner consumed by the image forming apparatus in the energy saving mode.

7. The image forming apparatus according to claim 1, further comprising a controller, wherein
    the controller reduces an amount of image formation output from the image forming apparatus based on facsimile communication in the energy saving mode.

8. An image forming system comprising:
    a user terminal; and
    an image forming apparatus communicably connected to the user terminal, and
    the image forming apparatus including:
        an apparatus side connecting part that communicably connects to the user terminal and outputs connection information;
        a connection detecting part that detects whether or not the apparatus side connecting part is communicably connected to the user terminal based on the connection information and outputs detection information;
        an apparatus side mode switching part that outputs, based on the detection information, mode information indicating a mode to which a consumption amount of a resource consumed by the image forming apparatus is allocated; and
        an apparatus side mode setting part that sets, based on the mode information, an energy saving mode in which the consumption amount of the resource consumed by the image forming apparatus is reduced as compared with the consumption amount of the resource consumed by the image forming apparatus in a case where the apparatus side connecting part and the user terminal are communicably connected, and
    the user terminal including:
        a terminal side connecting part that is communicably connected to the image forming apparatus, wherein
    the apparatus side connecting part is communicably connected to the terminal side connecting part and outputs the connection information, and
    the connection detecting part detects whether or not the apparatus side connecting part is communicably connected to the terminal side connecting part on the basis of the connection information and outputs the detection information.

9. The image forming system according to claim 8, further comprising a management terminal that manages the user terminal or the image forming apparatus,
    wherein the image forming apparatus further includes an apparatus side transmitting part that transmits the detection information, wherein the management terminal includes:
- a terminal side receiving part that receives the detection information;
- a terminal side mode switching part that outputs, based on the detection information, setting mode information indicating a mode to which the consumption amount of the resource consumed by the image forming apparatus is allocated; and
- a terminal side transmitting part that transmits the setting mode information, and wherein the image forming apparatus further includes an apparatus side receiving part that receives the setting mode information, and wherein when the detection information indicates that it has been detected, based on the setting mode information, that the apparatus side connecting part is not communicably connected to the terminal side connecting part, the apparatus side mode setting part sets the energy saving mode in which the consumption amount of the resource consumed by the image forming apparatus is reduced as compared with the amount of the resource consumed by the image forming apparatus in a case where the detection information indicates that the apparatus side connecting part and the terminal side connecting part are communicably connected.

10. The image forming system according to claim 9, wherein
when the detection information indicates that it has been detected, based on the setting mode information, that the apparatus side connecting part is communicably connected to the terminal side connecting part, the apparatus side mode setting part sets a normal mode in which the consumption amount of the resource consumed by the image forming apparatus is increased as compared with the consumption amount of the resource consumed by the image forming apparatus in a case where the detection information indicates that the apparatus side connecting part and the terminal side connecting part are not communicably connected.

* * * * *